United States Patent
Shahar et al.

(10) Patent No.: US 12,452,648 B2
(45) Date of Patent: Oct. 21, 2025

(54) MOBILE DEVICE COMPATIBILITY DETERMINATION

(71) Applicant: Starkey Laboratories, Inc., Eden Prairie, MN (US)

(72) Inventors: Amit Shahar, Hod Hasharon (IL); Majd Srour, San Jose, CA (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 366 days.

(21) Appl. No.: 18/055,496

(22) Filed: Nov. 15, 2022

(65) Prior Publication Data
US 2023/0164545 A1    May 25, 2023

Related U.S. Application Data

(60) Provisional application No. 63/290,476, filed on Dec. 16, 2021, provisional application No. 63/282,841, filed on Nov. 24, 2021.

(51) Int. Cl.
*H04W 8/22* (2009.01)

(52) U.S. Cl.
CPC ..................... *H04W 8/22* (2013.01)

(58) Field of Classification Search
CPC ......... H04L 67/02; H04L 69/24; H04L 67/01; H04L 67/34; H04W 8/22
See application file for complete search history.

(56) References Cited

U.S. PATENT DOCUMENTS

| | | | |
|---|---|---|---|
| 8,208,624 B2 | 6/2012 | Bowen | |
| 8,855,575 B2 | 10/2014 | Heines et al. | |
| 8,910,147 B2 * | 12/2014 | Chen | G06F 8/60 717/176 |
| 10,055,362 B2 * | 8/2018 | Kwon | G06F 9/4415 |
| 10,324,987 B2 * | 6/2019 | Patil | G06F 16/9535 |
| 11,006,187 B2 * | 5/2021 | Ryu | H04N 21/43615 |
| 2010/0211475 A1 * | 8/2010 | Nojima | H04L 63/10 455/418 |

(Continued)

FOREIGN PATENT DOCUMENTS

| | | | | |
|---|---|---|---|---|
| CN | 104737549 A | * | 6/2015 | ......... H04L 41/5058 |
| CN | 105635200 A | * | 6/2016 | |

(Continued)

OTHER PUBLICATIONS

Elite et al., "Mobile device compatibility (tablet/smartphone) with ANT+ or Bluetooth Smart", Retrieved from: https://elitesrl.zendesk.com/hc/en-us/articles/115004148729-Mobile-device-compatibility-tablet-smartphone-with-ANT-pr-Bluetooth-Smart, Accessed on: Oct. 27, 2021, 5 pp.

(Continued)

*Primary Examiner* — Dung Hong
(74) *Attorney, Agent, or Firm* — Shumaker & Sieffert, P.A.

(57) ABSTRACT

A computing system is configured to automatically determine and indicate a device compatibility between a mobile computing device and a secondary device. In some examples, in response to a user accessing a webpage on the mobile computing device, the computing system is configured to automatically compare specifications for the mobile computing device to a compatibility table for the secondary device, which in some examples, includes an ear-wearable device.

18 Claims, 7 Drawing Sheets

(56) References Cited

U.S. PATENT DOCUMENTS

| | | | | |
|---|---|---|---|---|
| 2010/0235373 A1* | 9/2010 | Holden | ............... | H04M 1/0254 |
| | | | | 709/227 |
| 2013/0309977 A1* | 11/2013 | Heines | ...................... | G06F 8/70 |
| | | | | 455/67.7 |
| 2014/0025537 A1* | 1/2014 | Venkataramu | ..... | G06Q 30/0621 |
| | | | | 705/26.61 |
| 2015/0010159 A1* | 1/2015 | Tran | ...................... | H04R 25/30 |
| | | | | 381/60 |
| 2015/0181285 A1* | 6/2015 | Zhang | ................ | H04N 21/6582 |
| | | | | 725/80 |
| 2016/0323108 A1* | 11/2016 | Bhogal | ................. | H04W 12/08 |
| 2018/0374146 A1* | 12/2018 | Rawal | ................ | G06Q 30/0645 |

FOREIGN PATENT DOCUMENTS

| | | | | |
|---|---|---|---|---|
| DE | 102015109825 A1 * | 12/2016 | .......... | H04M 1/6066 |
| EP | 3090357 B1 * | 6/2020 | ............. | H04L 67/34 |

OTHER PUBLICATIONS

Resound, "Check if your smartphone is compatible with your hearing aids", Retrieved from: https://www.resound.com/en-us/help/compatibility#androiddevice, Accessed on: Oct. 27, 2021, 10 pp.

Starkey, "Smartphone compatibility", Retrieved from: https://www.starkey.com/hearing-aids/apps/thrive-hearing-control/compatibility, Accessed on: Oct. 26, 2021, 2 pp.

Welcome, "Experience Welcome—Device Compatibility Check", Retrieved from: https://app.experiencewelcome.com/compatibility-check, Accessed on: Oct. 27, 2021, 1 pp.

\* cited by examiner

MOBILE DEVICE COMPATIBILITY DETERMINATION

This application claims the benefit of U.S. Provisional Patent Application No. 63/282,841, filed Nov. 24, 2021 and of U.S. Provisional Patent Application No. 63/290,476, filed Dec. 16, 2021, the entire contents of each of which are incorporated by reference.

TECHNICAL FIELD

This disclosure relates to mobile computing devices.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or osseointegrated into a user. Some hearing instruments include additional features beyond just environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes techniques for determining and indicating an inter-device compatibility between a mobile computing device and a secondary device, such as an ear-wearable device. In one illustrative example, a webpage displayed on a touchscreen of a mobile computing device (e.g., smartphone, tablet, etc.) is configured to compare device specifications of the mobile computing device to a compatibility table retrieved from memory, and determine, based on the comparison, whether the mobile computing device has functionality for interacting with a particular secondary device.

In some examples, a method includes: receiving, by a remote computing device from a mobile computing device, a webpage request comprising a Uniform Resource Locator (URL) and specifications of the mobile computing device; comparing, by the remote computing device, the specifications to a compatibility table associated with the webpage URL; determining, based on the comparison, a device compatibility between the mobile computing device and a secondary device associated with the compatibility table; and transmitting, by the remote computing device, an indication of the device compatibility for display on the mobile computing device.

In other examples, this disclosure describes a mobile computing device comprising: an output device; and processing circuitry configured to: receive a URL of a compatibility-checker webpage; transmit, to a remote server, a webpage request comprising the URL and specifications of the mobile computing device; receive, from the remote server, an indication of a compatibility between the mobile computing device and a secondary device associated with the compatibility-checker webpage; and output, via the output device, the indication of the compatibility between the mobile computing device and the secondary device.

In some examples, this disclosure describes a computer system comprising processing circuitry configured to: receive, from a mobile computing device, a webpage request comprising a webpage URL and specification of the mobile computing device; compare the specifications to a compatibility table associated with the webpage URL; determine, based on the comparison, a device compatibility between the mobile computing device and a secondary device associated with the compatibility table; and transmit, to the mobile computing device, an indication of the device compatibility for display on a touchscreen of the mobile computing device.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

When a user is obtaining a hearing instrument at an audiologist's office, the audiologist may check a device model and operating system of the user's mobile computing device (e.g., a mobile phone) on a website to see if the user's mobile computing device is compatible with the hearing instrument. This may be time consuming and may require special technical skills. This may be an even a bigger problem in healthcare systems where there is pressure to finish a fitting session as fast as possible. As a result, an audiologist may simply prefer to provide hearing instruments that the audiologist knows to be compatible with a large number of mobile computing device (e.g., phones that have classic Bluetooth®), and accordingly does not perform any compatibility check.

This disclosure describes example systems and techniques for determining and indicating an inter-device compatibility between a mobile computing device, such as a smartphone or tablet, and a secondary device, such as a hearing instrument or earbud. In one illustrative example, a webpage displayed on a touchscreen of a mobile computing device includes an indication of an automatic determination of whether the mobile computing device includes required functionality for streaming data to and from a particular secondary device.

Figure 1:
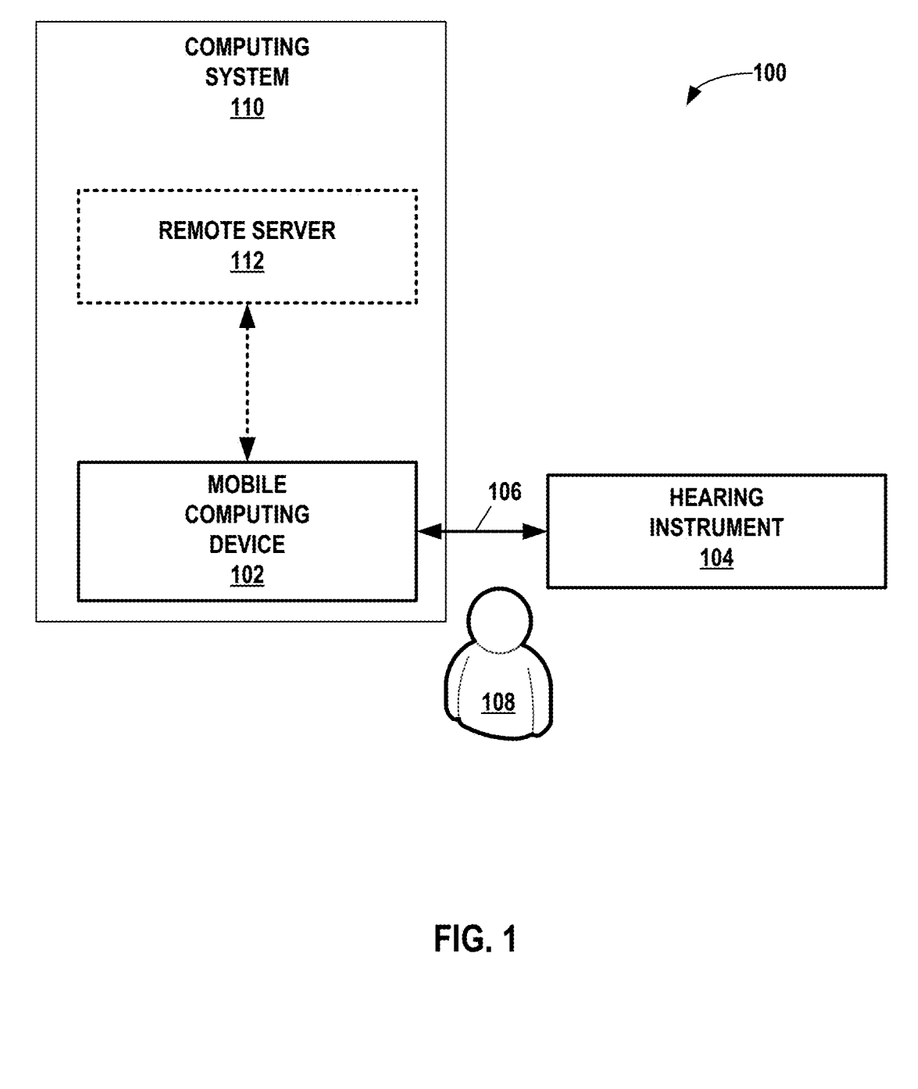
FIG. 1 is a conceptual diagram illustrating an example system for determining a compatibility between a mobile computing device and a secondary device.

For instance, FIG. 1 is a conceptual diagram illustrating an example system 100 for determining and indicating a device compatibility between a mobile computing device 102 and a secondary device. In particular, system 100 is configured to determine and indicate whether mobile computing device 102 includes functionality for streaming data 106 to and from the secondary device. For purposes of illustration, the secondary device is shown and described as a hearing instrument 104 (or "hearing aid"). However, the techniques of this disclosure encompass compatibility determinations for all types of secondary devices including, but not limited to, other ear-wearable devices (e.g., earbuds), other wearable devices (e.g., smartwatches, smart glasses), vehicles, other computing devices, smart televisions, or the like.

In some examples, system 100 is configured to determine compatibility between mobile computing device 102 and hearing instrument 104 by determining whether one or more functionalities of hearing instrument 104 may be performed with mobile computing device 102. The one or more functionalities of secondary device may include, but are not limited to, streaming data 106 to and from hearing instrument 104, generating one or more outputs (e.g., tactile, audio) in response to data 106 from mobile computing device 102, amplifying incoming sounds, or configuring mobile computing device 102 to remotely control the operation of hearing instrument 104. In some examples with a plurality of hearing instruments 104, one or more hearing instruments 104 may be currently configured to perform one functionality, such as playing audio from mobile computing device 102, while one or more other hearing instruments 104 may be configured to perform another functionality, such as amplifying incoming sounds.

In some examples, hearing instruments 104 may be connected to an intermediary device (e.g., a hearing aid streamer) which is connected to mobile computing device 102. In some examples, system 100 is configured to determine compatibility between mobile computing device 102 and hearing instrument 104 by determining the compatibility between mobile computing device 102 and the intermediary device.

A user 108 may wear hearing instruments 104. In some instances, user 108 may wear a single hearing instrument 104. In other instances, the user may wear two hearing instruments 104, with one hearing instrument 104 for each ear of the user.

Hearing instruments 104 may comprise one or more of various types of devices that are configured to provide auditory stimuli to a user and that are designed for wear and/or implantation at, on, or near an ear of the user. Hearing instruments 104 may be worn, at least partially, in the ear canal or concha. One or more of hearing instruments 104 may include behind-the-ear (BTE) components that are worn behind the ears of user 108. In some examples, hearing instruments 104 comprise devices that are at least partially implanted into or osseointegrated with the skull of the user 108. In some examples, one or more of hearing instruments 104 is able to provide auditory stimuli to user 108 via a bone-conduction pathway.

In any of the examples of this disclosure, each of hearing instruments 104 may comprise a hearing assistance device. Hearing assistance devices include devices that help a user hear sounds in the user's environment. Example types of hearing assistance devices may include hearing aid devices, sound amplifiers (e.g., Personal Sound-Amplification Products (PSAPs)), cochlear implant systems (which may include cochlear implant magnets, cochlear implant transducers, and cochlear implant processors), and so on. In some examples, hearing instruments 104 are over-the-counter, direct-to-consumer, or prescription devices. Furthermore, in some examples, hearing instruments 104 include devices that provide auditory stimuli to the user that correspond to artificial sounds or sounds that are not naturally in the user's environment, such as recorded music, computer-generated sounds, or other types of sounds. For instance, hearing instruments 104 may include so-called "hearables," earbuds, earphones, or other types of devices. Some types of hearing instruments provide auditory stimuli to the user corresponding to sounds from the user's environmental and/or artificial sounds. For example, hearing instrument 104 may be configured to amplify the sounds from the user's environment in a first mode and to play recorded music from mobile computing device 102 in a second mode. In some examples, hearing instrument 104 may be configured to only operate in a single mode at a time while in still other examples hearing instruments 104 may be configured to operate in both modes simultaneously.

In some examples, one or more of hearing instruments 104 includes a housing or shell that is designed to be worn in the ear for both aesthetic and functional reasons and encloses the electronic components of hearing instrument 104. Such hearing instruments may be referred to as in-the-ear (ITE), in-the-canal (ITC), completely-in-the-canal (CIC), or invisible-in-the-canal (IIC) devices. In some examples, one or more of hearing instruments 104 may be behind-the-ear (BTE) devices, which include a housing worn behind the ear that contains all of the electronic components of the hearing instrument, including the receiver (i.e., the speaker). The receiver conducts sound to an earbud inside the ear via an audio tube. In some examples, one or more of hearing instruments 104 may be receiver-in-canal (RIC) hearing-assistance devices, which include a housing worn behind the ear that contains electronic components and a housing worn in the ear canal that contains the receiver.

Hearing instruments 104 may implement a variety of features that help user 108 hear better. For example, hearing instruments 104 may amplify the intensity of incoming sound, amplify the intensity of certain frequencies of the incoming sound, translate or compress frequencies of the incoming sound, and/or perform other functions to improve the hearing of user 108. In some examples hearing instruments 104 may be omnidirectional and may amplify all incoming sound. In another example, hearing instruments 104 may implement a directional processing mode in which hearing instruments 104 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 104 may use beamforming or directional processing cues to implement or augment directional processing modes.

In some examples, hearing instruments 104 may reduce noise by canceling out or attenuating certain frequencies. Furthermore, in some examples, hearing instruments 104 may help user 108 enjoy audio media, such as music or sound components of visual media, by outputting sound based on audio data wirelessly transmitted to hearing instruments 104. In some examples, hearing instruments 104 may amplify sounds within a certain sound pressure level range and cancel out or attenuate sounds outside the sound pressure level range. For example, hearing instruments 104 may amplify incoming sounds that are between 20-60 decibel (dB) and cancel out or attenuate incoming sounds that are greater than 60 dB.

In examples including multiple (e.g., two or more) hearing instruments 104, hearing instruments 104 may be configured to communicate with each other. For instance, in any of the examples of this disclosure, hearing instruments 104 may communicate with each other using one or more wirelessly communication technologies. Example types of wireless communication technology include Near-Field Magnetic Induction (NFMI) technology, a 900 MHz technology, a BLUETOOTH® technology, a WI-FI™ technology, audible sound signals, ultrasonic communication technology, infrared communication technology, an inductive communication technology, or another type of communication that does not rely on wires to transmit signals between devices. In some examples, hearing instruments 104 use a 2.4 GHz frequency band for wireless communication. In some examples, hearing instruments 104 may communicate with each other via non-wireless communication links, such as via one or more cables, direct electrical contacts, and so on.

As shown in the example of FIG. 1, system 100 may also include a computing system 110. Computing system 110 may include mobile computing device 102 and remote server 112. In some examples, computing system 110 may include additional devices. The devices of computing system 110 (e.g., mobile computing device 102 and server 112) may be communicatively coupled with one another. The devices of computing system 110 may include one or more processors. Computing system 110 may comprise one or more remote computing devices such as, but is not limited to, mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 104. Example types of accessory devices may include charging cases for hearing instruments 104, storage cases for hearing instruments 104, media streamer devices, phone streamer devices, external microphone devices, remote controls for hearing instruments 104, and other types of devices specifically designed for use with hearing instruments 104. Accessory devices may also include intermediary devices configured to communicate with hearing instruments 104 and mobile computing device 102. Actions described in this disclosure as being performed by the computing system 110 may be performed by one or more of the computing devices of computing system 110. In applicable examples, one or more of hearing instruments 104 may communicate with mobile computing device 102 using wireless or non-wireless communication links. For instance, hearing instruments 104 may communicate with computing system 110 using any of the example types of communication technologies described elsewhere in this disclosure. In some examples, the actions performed by remote server 112 may be performed on mobile computing device. In other examples, the actions performed by remote server 112 may be performed on a cloud server.

In some examples in accordance with this disclosure, computing system 110 is configured to automatically (e.g., with little-to-no user intervention) determine and indicate a device compatibility for streaming data 106 between mobile computing device 102 and hearing instrument(s) 104. For instance, remote server 112 may receive a webpage request from mobile computing device 102. The webpage request may include a URL for a compatibility-checker webpage, and in some examples, but not all examples, one or more device specifications for mobile computing device 102. In some such examples, the one or more device specifications may be part of a "user agent" or "system agent" that is automatically transmitted to remote server 112 along with the webpage request. In some examples in accordance with this disclosure, computing system 110 is configured to determine and indicate a device compatibility between mobile computing device 102 and hearing instrument(s) 104 in response to a user request to check compatibility.

In some examples, computing system 110 may send instructions to mobile computing device 102 to enter into a client mode. In other examples, remote server 112 may send instructions to mobile computing device 102 to enter into the client mode. Client mode may be a mode in which mobile computing device 102 may transmit and receive data from computer system 110 and/or remote server 112, and in which mobile computing device 102 may determine one or more specifications (e.g., hardware specifications, device specifications) of mobile computing device 102 which be relevant in determining device compatibility between mobile computing device 102 and hearing instrument(s) 104. While mobile computing device 102 is in the client mode, computing system 110 may identify the hardware specifications of mobile computing device 102. The hardware specifications of mobile computing device 102 may include the version of the Central Processing Unit (CPU) and or the Graphics Processing Unit (GPU) of mobile computing device 102.

In other examples, remote server 112 is configured to retrieve the one or more device specifications from mobile computing device 102 in response to receiving the webpage request. In either example, the one or more device specifications may include a device manufacturer (e.g., device brand name), a device model name and/or number, an operating-system version name and/or number, and/or other metadata associated with mobile computing device 102. In other examples, remote server 112 is also configured to retrieve the hardware specifications of mobile computing device 102.

In response to receiving the device specifications, remote server 112 is configured to compare the device specifications to list of compatible-device specifications stored within a lookup table associated with hearing instrument 104. Upon identifying an entry corresponding to the received device specifications within the lookup table, remote server 112 generates and transmits to mobile computing device 102 a positive indication of device compatibility (or partial compatibility, as appropriate). Mobile computing device 102 may display the positive indication, such as on a touchscreen of the mobile computing device. For example, mobile computing device 102 may display "YOUR DEVICE IS SUPPORTED" on a screen of the mobile computing device.

In cases in which remote server 112 does not identify corresponding entr(ies) within the lookup table, remote server 112 is configured to generate and transmit, back to mobile computing device 102, a negative indication of device compatibility for display on the touchscreen. For example, mobile computing device 102 may display "YOUR DEVICE IS NOT SUPPORTED." In some such examples, the negative indication may further include a prompt for user 108 that device compatibility may be attained by updating an operating system, firmware, application, or other software of mobile computing device 102. In some examples, computing system 110 is configured to automatically determine and indicate a device compatibility between mobile computing device 102 and hearing instrument(s) 104 in response to changes to one or more device specifications of mobile computing device 102 and hearing instrument(s) 104. The changes may include updates to the operating system, changes in operating system, and/or other changes in metadata.

In one illustrative, non-limiting example in which mobile computing device 102 includes an Android™-based operating system, and wherein the secondary device includes a hearing instrument 104, computing system 110 is configured to determine whether mobile computing device 102 supports Android™ Streaming for Hearing Aids (ASHA) or Bluetooth® Low Energy Audio (LEA) for communication of data 106 with hearing instrument 104.

In some examples, remote server 112 includes an autonomous script configured to periodically (e.g., hourly, daily, etc.) update the lookup table comprising the list of compatible devices and/or operating systems. For instance, remote server 112 may be configured to periodically check a master list that is maintained, e.g., by a manufacturer of hearing instrument 104, for newly compatible devices and/or operating systems, and update its own copy of the list upon discovering a discrepancy. In other examples, remote server 112 may update the lookup table in response to an instruction from mobile computing device 102. In some examples, the lookup table may additionally comprise list(s) of compatible hardware versions (e.g., CPU versions, GPU versions) and remote server 112 may be configured to update the list(s) accordingly. In some examples, at least a portion of the lookup table, such as list(s) of compatible hardware versions, may be stored in mobile computing device 102 (e.g., in a memory of mobile computing device 102).

Figure 2:
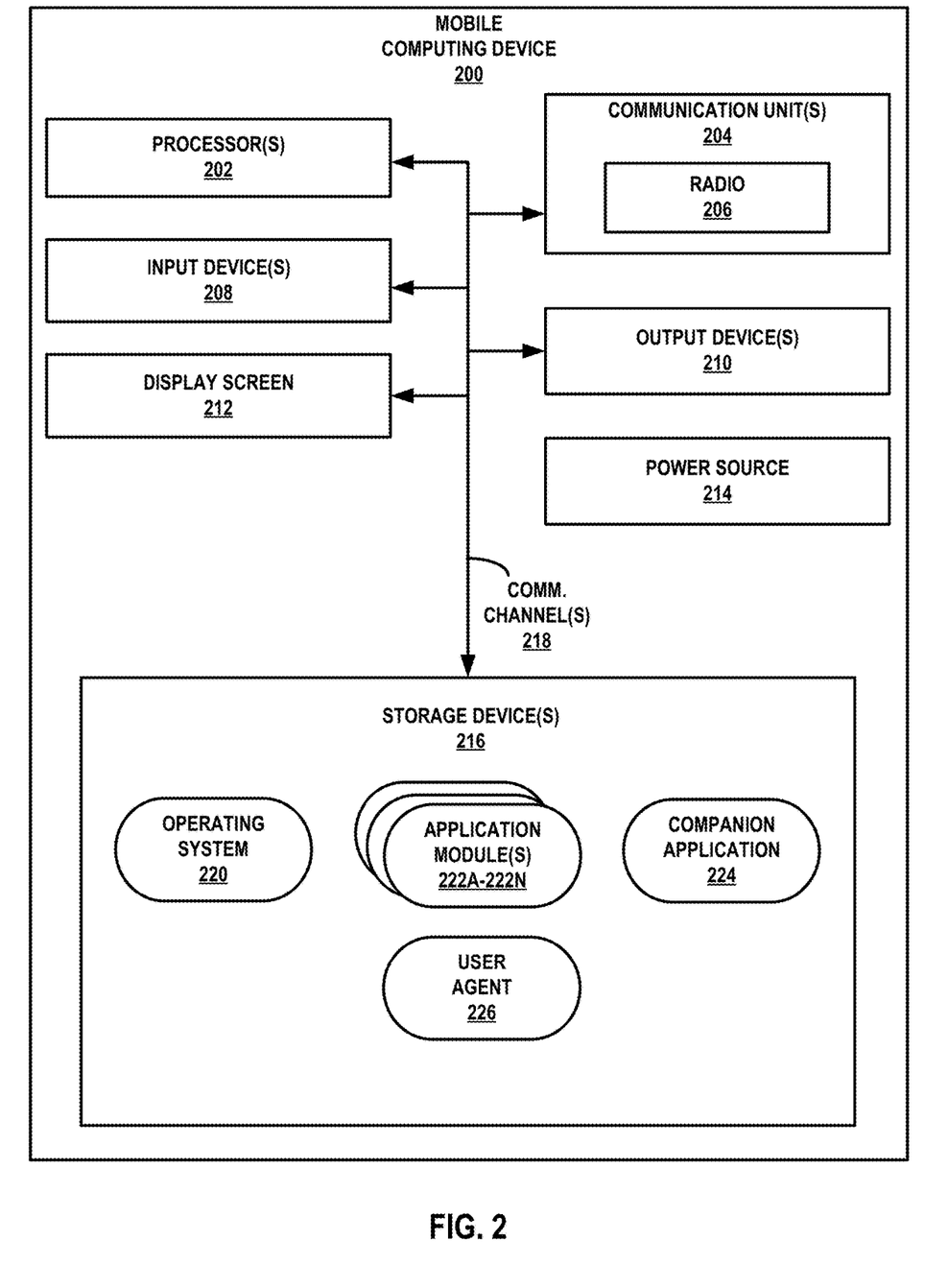
FIG. 2 is a block diagram illustrating example components of the mobile computing device of FIG. 1.

FIG. 2 is a block diagram illustrating example components of mobile computing device 200, which is an example of mobile computing device 102 of FIG. 1. FIG. 2 illustrates only one particular example of mobile computing device 200, and many other example configurations of mobile computing device 200 exist.

As shown in the example of FIG. 2, computing device 200 includes one or more processor(s) 202, one or more communication unit(s) 204, one or more input device(s) 208, one or more output device(s) 210, a display screen 212, a power source 214, one or more storage device(s) 216, and one or more communication channels 218. Computing device 200 may include other components. For example, computing device 200 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source 214 may provide electrical energy to components 202, 204, 208, 210, 212 and 216.

Storage device(s) 216 may store information required for use during operation of computing device 200. In some examples, storage device(s) 216 have the primary purpose of being a short term and not a long-term computer-readable storage medium. Storage device(s) 216 may be volatile memory and may therefore not retain stored contents if powered off. In some examples, storage device(s) 216 may further be configured for long-term storage of information as non-volatile memory space and retain information after power on/off cycles. In some examples, processor(s) 202 of computing device 200 read and may execute instructions stored by storage device(s) 216.

Computing device 200 may include one or more input device(s) 208 that computing device 200 uses to receive user input. Examples of user input include tactile, audio, and video user input. Input device(s) 208 may include presence-sensitive screens, touch-sensitive screens, mice, keyboards, voice responsive systems, microphones or other types of devices for detecting input from a human user 108 (FIG. 1) or machines.

Communication unit(s) 204 may enable mobile computing device 200 to send data to and receive data from one or more other computing devices (e.g., remote server 112 of FIG. 1) (e.g., via a communications network, such as a local area network or the Internet). For instance, communication unit(s) 204 may be configured to receive data from hearing instrument(s) 104. In some examples, communication unit(s) 204 may include wireless transmitters and receivers that enable mobile computing device 200 to communicate wirelessly with the other computing devices. For instance, in the example of FIG. 3, communication unit(s) 204 include a radio 206 that enables computing device 200 to communicate wirelessly with other computing devices, such as hearing instruments 104 (FIG. 1) and remote server 112. Examples of communication unit(s) 204 may include network interface cards, Ethernet cards, optical transceivers, radio frequency transceivers, or other types of devices that are able to send and receive information. Other examples of such communication units may include Bluetooth™, Bluetooth™ Low-Energy (BLE™) 3G, 4G, 5G, and Wi-Fi™ radios, Universal Serial Bus (USB) interfaces, etc. Mobile computing device 200 may use communication unit(s) 204 to communicate with one or more hearing instruments (e.g., hearing instrument 104). Additionally, computing device 200 may use communication unit(s) 204 to communicate with one or more other remote devices. In other examples, communication unit(s) 204 may be configured to communicate with hearing instrument(s) 104 through one or more intermediary devices. For example, communication unit(s) 204 may communicate with a hearing instrument streamer which is configured to communicate with hearing instrument(s) 104 and to deliver data from communication unit(s) 204 to hearing instrument(s) 104.

Output device(s) 210 may generate output. Examples of output include tactile, audio, and video output. Output device(s) 210 may include presence-sensitive screens, sound cards, video graphics adapter cards, speakers, liquid crystal displays (LCD), or other types of devices for generating output. In some examples, computing device 200 may also provide output to user through hearing instrument(s) 104. For example, computing device 200 may output computer-generated sound through the speakers on computing device 200 or may output the computer-generated sound through one or more hearing aids.

Processor(s) 202 may read instructions from storage device(s) 216 and may execute instructions stored by storage device(s) 216. Execution of the instructions by processor(s) 202 may configure or cause mobile computing device 200 to provide at least some of the functionality ascribed in this disclosure to mobile computing devices 102, 200. As shown in the example of FIG. 2, storage device(s) 216 include computer-readable instructions associated with operating system 220, application modules 222A-222N (collectively, "application modules 222"), and a companion application 224.

Additionally, in the example of FIG. 2, storage device(s) 216 may store user agent 226. User agent 226 may be configured to facilitate interaction between computing device 200 and web content (e.g., a compatibility-checker webpage). User agent 226 may include metadata for mobile computing device 200, including, but not limited to, the device manufacturer and model name and/or number, operating-system name and version number, and other metadata.

Execution of instructions associated with operating system 220 may cause computing device 200 to perform various functions to manage hardware resources of computing device 200 and to provide various common services for other computer programs. Execution of instructions associated with application modules 222 may cause computing device 200 to provide one or more of various applications (e.g., "apps," operating system applications, etc.) to user 108. Application modules 222 may also provide particular applications, such as text messaging (e.g., SMS) applications, instant messaging applications, email applications, social media applications, text composition applications, and so on.

Execution of instructions associated with companion application 224 by processor(s) 202 may cause computing device 200 to perform one or more of various functions. In some examples, companion application 224 is an instance of a web application or server application, configured to receive, via a touchscreen of mobile computing device 200, user input (including a URL) from a user and to transmit a webpage request that includes the URL and user agent 226 to remote server 112 (FIG. 1). In other examples, companion application 224 is configured to receive user input from user 108 via one or more other input devices 208 of computing device 200 (e.g., microphone, camera, keyboard). In other examples, companion application 224 is an instance of a camera application for an image-capture device of mobile computing device 200. In some such instances, companion application 224 is configured to cause the camera to capture one or more images of an environment local to mobile computing device, and further configured to identify a matrix barcode, such as a quick-response (QR) code, within the one or more images. Upon identifying such a matrix barcode, companion application 224 may prompt user 108 to confirm a URL associated with the matrix barcode, and, upon receiving such confirmation, transmit an appropriate webpage request to remote server 112. In other examples, companion application 224 is configured to cause processor 202 to capture one or more images currently displayed on display screen 212 of computing device 200 and to identify a matrix barcode within the one or more images.

Figure 3:
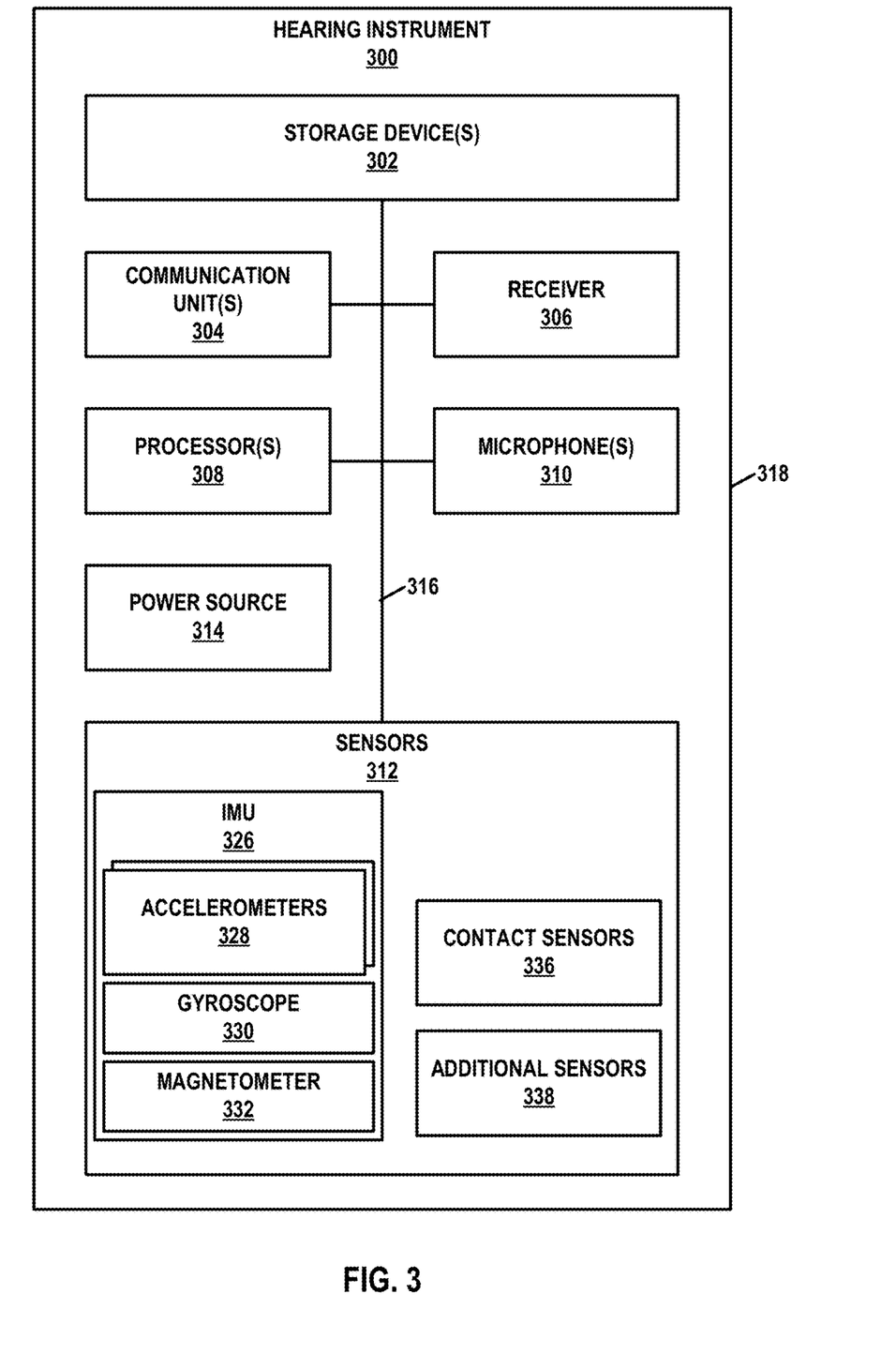
FIG. 3 is a block diagram illustrating an example of the secondary device of FIG. 1.

FIG. 3 is a block diagram illustrating example components of a hearing instrument 300, which is just one non-limiting, illustrative example of hearing instrument 104 of FIG. 1. In the example of FIG. 3, hearing instrument 300 comprises one or more storage devices 302, one or more communication unit(s) 304, a receiver 306, one or more processor(s) 308, one or more microphone(s) 310, a set of sensors 312, a power source 314, and one or more communication channels 316. Communication channels 316 provide communication between storage devices 302, communication unit(s) 304, receiver 306, processor(s) 308, a microphone(s) 310, and sensors 312. Components 302, 304, 306, 308, 310, and 312 may draw electrical power from power source 314.

In the example of FIG. 3, each of components 302, 304, 306, 308, 310, 312, 314, and 316 are contained within a single housing 318. However, in other examples of this disclosure, components 302, 304, 306, 308, 310, 312, 314, and 316 may be distributed among two or more housings. For instance, in an example where hearing instrument 300 is a RIC device, receiver 306 and one or more of sensors 312 may be included in an in-ear housing separate from a behind-the-ear housing that contains the remaining components of hearing instrument 300. In such examples, a RIC cable may connect the two housings. In other examples, one or more components 302, 304, 306, 308, 310, 312, 314, and 316 may be contained within an intermediary device configured to communicate with a mobile computing device (e.g., mobile computing device 102) and the other components 302, 304, 306, 308, 310, 312, 314, and 316 of hearing instrument 300.

Furthermore, in the example of FIG. 3, sensors 312 include an inertial measurement unit (IMU) 326 that is configured to generate data regarding the motion of hearing instrument 300. IMU 326 may include a set of sensors. For instance, in the example of FIG. 3, IMU 326 includes one or more of accelerometers 328, a gyroscope 330, a magnetometer 332, combinations thereof, and/or other sensors for determining the motion of hearing instrument 300. Furthermore, in the example of FIG. 3, hearing instrument 300 may include one or more contact sensors 336 and additional sensors 338. Contact sensors 336 may include electrodes and/or piezoelectric sensors, for example. Additional sensors 338 may include photoplethysmography (PPG) sensors, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, microphones, and/or other types of sensors. In other examples, hearing instrument 300 and sensors 312 may include more, fewer, or different components. In some examples, sensors 312 may be contained in a same housing as other components of hearing instrument 300. In other examples, sensor 312 may be contained in a different housing configured to generate data regarding user 108 and configured to communicate the data to hearing instrument 300 and/or mobile computing device 102.

Storage devices 302 may store data. Storage devices 302 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 302 may further be configured for long-term storage of information as non-volatile memory space and retain information after power on/off cycles. Examples of non-volatile memory configurations may include magnetic hard discs, optical discs, flash memories, or forms of electrically programmable memories (EPROM) or electrically erasable and programmable (EEPROM) memories.

Communication unit(s) 304 may enable hearing instrument 300 to send data to and receive data from one or more other devices, such mobile computing device 200 (FIG. 2), another hearing instrument, an accessory device, or another type of device. Communication unit(s) 304 may enable hearing instrument 300 using wireless or non-wireless communication technologies. For instance, communication unit(s) 304 enable hearing instrument 300 to communicate using one or more of various types of wireless technology, such as a Bluetooth™ technology, Bluetooth™ Low-Energy, 3G, 4G, 4G LTE, 5G, ZigBee, Wi-Fi™, Near-Field Magnetic Induction (NFMI), ultrasonic communication, infrared (IR) communication, or another wireless communication technology. In some examples, communication unit(s) 304 may enable hearing instrument 300 to communicate using a cable-based technology, such as a Universal Serial Bus (USB) technology.

Receiver 306 comprises one or more speakers for generating audible sound. Microphone(s) 310 detects incoming sound and generates one or more electrical signals (e.g., an analog or digital electrical signal) representing the incoming sound.

Processor(s) 308 may be processing circuits configured to perform various activities. For example, processor(s) 308 may process the signal generated by microphone(s) 310 to enhance, amplify, or cancel-out particular channels within the incoming sound. Processor(s) 308 may then cause receiver 306 to generate sound based on the processed signal. In some examples, processor(s) 308 include one or more digital signal processors (DSPs). In some examples, processor(s) 308 may cause communication unit(s) 304 to transmit one or more of various types of data. For example, processor(s) 308 may cause communication unit(s) 304 to transmit data to mobile computing device 200 (FIG. 2). Furthermore, communication unit(s) 304 may receive audio data from mobile computing device 200 and processor(s) 308 may cause receiver 306 to output sound based on the audio data.

Figure 4:
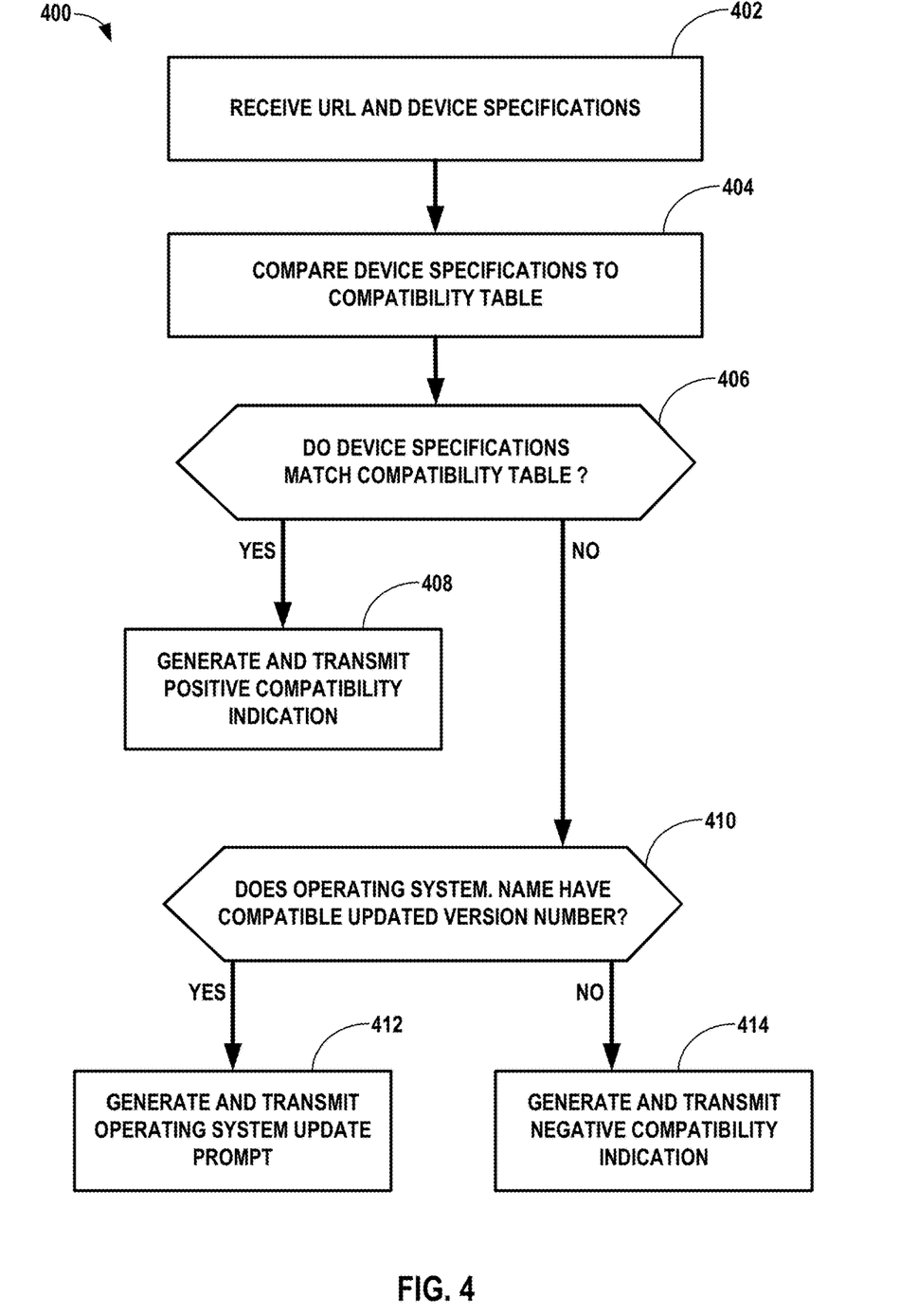
FIG. 4 is a flowchart illustrating an example operation for determining a compatibility between a mobile computing device and a secondary device.

FIG. 4 is a flowchart illustrating an example operation 400 for determining and indicating a compatibility between a mobile computing device and a secondary device, such as a hearing instrument. Operation 400 is described with respect to system 100 of FIG. 1. Other examples of this disclosure may include more, fewer, or different actions. Remote server 112 is configured to wirelessly receive data from mobile computing device 102 that includes a URL for the webpage, and one or more specifications of mobile computing device 102 issuing the request (402). Remote server 112 may also wirelessly receive data from mobile computing device 102 that includes user agent and/or system agent. In some examples, remote server 112 may also wirelessly transmit instructions to mobile computing device 102 to enter into a client mode. Mobile computing device 102, while in the client mode, may be instructed to determine the hardware specifications of mobile computing device 102 and to transmit the hardware specifications to remote server 112. The hardware specifications may include the version number of the CPU and/or GPU of mobile computing device 102.

Remote server 112 may compare the device specifications, such as a manufacturer, model, and/or operating system version of mobile computing device 102, to a list of compatible devices and operating systems stored in a lookup table of devices and/or operating systems that are known to be data-compatible with a secondary device, such as hearing instrument 104 (404). In other examples, remote server 112 may also compare the hardware specifications, such as the CPU version and/or the GPU version, to the list of compatible device and operating systems.

Remote server 112 determines, based on the comparison to the lookup table, whether mobile computing device 102 is compatible with hearing instrument 104, such as according to respective wireless-data protocols, physical data circuitry, or other requirements (406). In instances in which remote server 112 determines that the devices 102, 104 are compatible ("YES" branch from 406), remote server 112 generates, and transmits to mobile computing device 102, a positive compatibility indication, an example of which is shown as graphical user interface (GUI) 500A of FIG. 5A.

In some examples, remote server 112 may determine whether mobile computing device 102 is compatible with hearing instrument 104 for at least some of the functionalities of hearing instrument 104. In some examples, remote server 112 may determine that the devices 102 and 104 are compatible even if some of the functionalities of hearing instrument 104 is incompatible. In some examples, remote server 112 may determines that the devices 102 and 104 are compatible if mobile computing device 102 is compatible with a user-desired functionality of hearing instruments 104 (e.g., amplifying nearby sound, outputting recorded sounds through hearing instruments 104).

In instances in which remote server 112 determines that the devices 102, 104 are not directly compatible ("NO" branch from 406), remote server 112 may, in some examples, determine whether a name of the current operating system of mobile computing device 102 appears within the lookup table, but the version number of the current operating system of mobile computing device 102 does not appear in the lookup table (410). In such instances in which the name of the current operating system of mobile computing device 102 appears within the lookup table but the version number of the current operating system of mobile computing device 102 does not appear within the lookup table ("YES" branch from 410), remote server 112 may generate an operating system update prompt and transmit the operating system update prompt to mobile computing device 102 (412). The operating system update prompt may prompt user 108 to update the current operating system of mobile computing device 102 in order to enable device compatibility. In instances in which the name of the current operating system of mobile computing device 102 does not appear within the lookup table ("NO" branch from 410), remote server 112 generates, and transmits to mobile computing device 102, a negative compatibility indication for display, e.g., on the touchscreen of mobile computing device 102 (414). In some examples, upon a determination that device specifications do not match compatibility table ("NO" branch of 406), operation 400 may further determine if there are any functionalities of secondary device (e.g., amplifying nearby sound) that mobile computing device is compatible for.

Figure 5A:
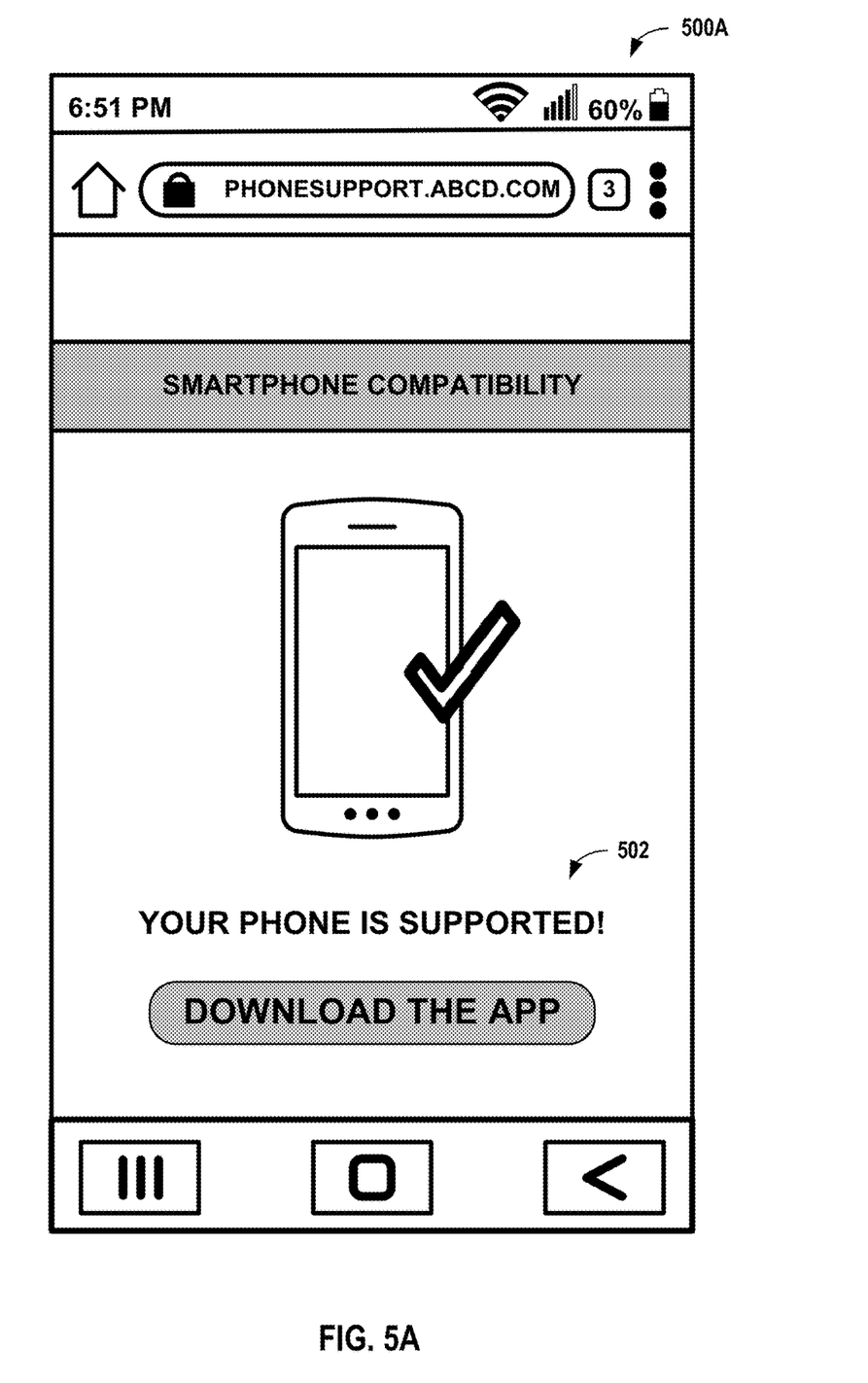
FIG. 5A is a screenshot illustrating a first example graphical user interface (GUI) that may be displayed on a mobile computing device.

FIG. 5A is a screenshot illustrating a first example graphical user interface (GUI) 500A that may be displayed on a mobile computing device. As described above, remote server 112 (FIG. 1) may be configured, in appropriate instances, to transmit to mobile computing device 102, a positive indication of device compatibility, such as indication 502 on GUI 500A, stating, "Your phone is supported!" In some examples, indication 502 may include a list of the functionalities that mobile computing device 102 and hearing instruments 104 are capable of performing. For example, indication 502 may include an indication to user 108 that hearing instruments 104 are capable of playing music and/or other audio from mobile computing device 102. In some examples, GUI 500A may provide an option to install one or more applications corresponding to hearing instruments 104 onto mobile computing device 102. The one or more applications may be configured to adjust one or more settings of hearing instruments 104 (e.g., audio level, microphone sensitivity). The one or more applications may also facilitate connection between one or more other applications on mobile computing device 102 (e.g., Netflix, YouTube, Facebook) and hearing instruments 104 such that audio from the one or more other applications may be outputted through hearing instruments 104.

Figure 5B:
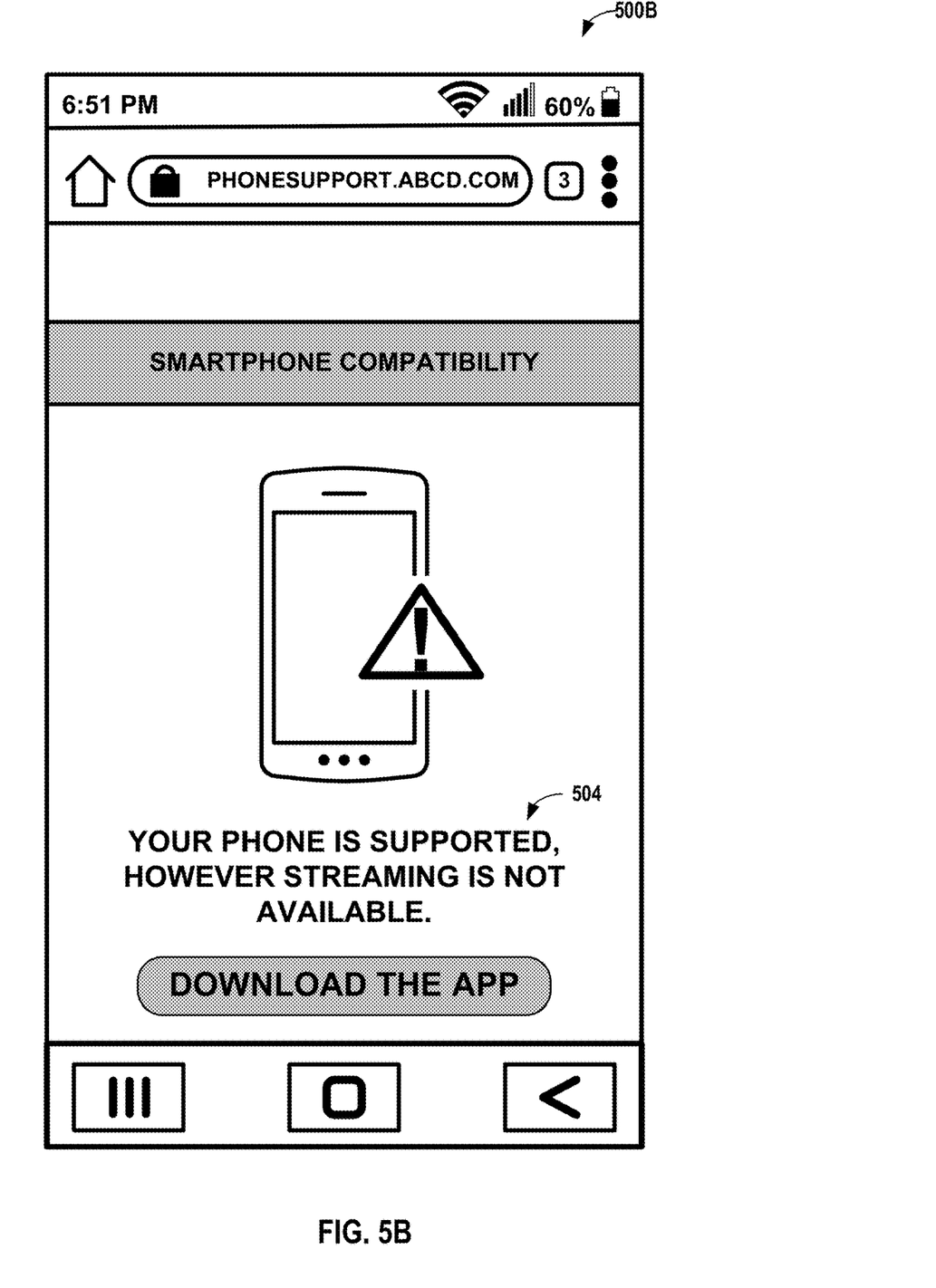
FIG. 5B is a screenshot illustrating a second example GUI that may be displayed on a mobile computing device.
Figure 5C:
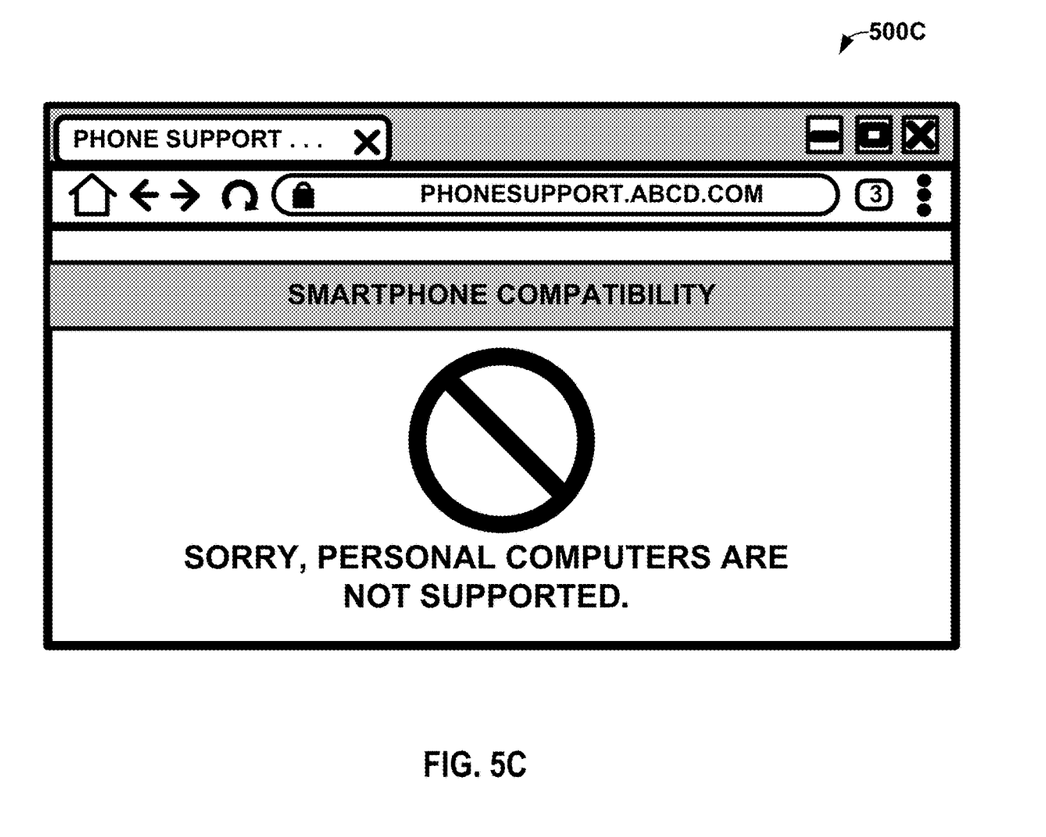
FIG. 5C is a screenshot illustrating a third example GUI that may be displayed on a personal computing device.

By contrast, FIG. 5B is a screenshot illustrating a second example GUI 500B that may be displayed on mobile computing device 102 (FIG. 1). GUI 500B includes a negative indication 504 of device compatibility or of partial device compatibility. In particular, negative indication 504 states, "Your phone is supported, however streaming is not available." For instance, remote server 112 may generate GUI 500C in response to determining that an operating system of mobile computing device 102 is supported but a model of mobile computing device 102 is not, or alternatively, that a model of mobile computing device 102 is supported by an operating system of mobile computing device 102 is not. In some examples, GUI 500C may display one or more functionalities of hearing instruments 104 that are compatible with mobile computing device 102 in cases of partial device compatibility.

FIG. 5C is a screenshot illustrating a third example GUI 500C that may be displayed on a personal computing device. In relevant instances, remote server 112 (FIG. 1) may be configured to determine, based on a user agent or system agent included with a received webpage request, that the webpage request originated from a browser of a computer, such as a laptop or personal computer (PC), rather than a more-mobile computing device, such as a smartphone. In such cases, remote server 112 may be configured to return GUI 500C, indicating to the user that the computer is not supported for data-interaction with hearing instrument 104.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The following is a non-limited list of examples in accordance with one or more techniques of this disclosure.

Example 1: a method comprising: receiving, by a remote computing device from a mobile computing device, a webpage request comprising a webpage Uniform Resource Location (URL) and specifications of the mobile computing device; comparing, by the remote computing device, the specifications to a compatibility table associated with the webpage URL; determining, based on the comparison, a device compatibility between the mobile computing device and a secondary device associated with the compatibility table; and transmitting, by the remote computing device, an indication of the device compatibility for display on the mobile computing device.

Example 2: the method of example 1, wherein the specifications of the mobile computing device comprise a user agent of the mobile computing device.

Example 3: the method of example 1 or example 2, wherein the specifications of the mobile computing device comprise an operating system version of the mobile computing device.

Example 4: the method of any of examples 1-3, wherein the specifications of the mobile computing device comprise a device brand and a device model of the mobile computing device.

Example 5: the method of any of examples 1-4, wherein the secondary device comprises an ear-wearable device.

Example 6: the method of example 5, wherein the ear-wearable device comprises a hearing aid or an earbud.

Example 7: the method of any of examples 1-6, wherein the indication of device compatibility comprises an indication of whether the mobile computing device supports Android Streaming for Hearing Aids (ASHA).

Example 8: a mobile computing device comprising: an output device; and processing circuitry configured to: receive a Uniform Resource Locator (URL) of a compatibility-checker webpage; transmit, to a remote server, a webpage request comprising the URL and specifications of the mobile computing device; receive, from the remote server, an indication of a compatibility between the mobile computing device and a secondary device associated with the compatibility-checker webpage; and output, via the output device, the indication of the compatibility between the mobile computing device and the secondary device.

Example 9: the mobile computing device of example 8, wherein: the mobile computing device further comprises a camera configured to generate an image of a matrix barcode; and the processing circuitry is configured, as part of obtaining the URL, to determined the URL based on the matrix barcode.

Example 10: the mobile computing device of example 8 or example 9, wherein the specifications of the mobile computing device comprise a user agent of the mobile computing device.

Example 11: the mobile computing device of any of examples 8-10, wherein the specifications of the mobile computing device comprises an operating system version of the mobile computing device.

Example 12: the mobile computing device of any of examples 8-11, wherein the specifications of the mobile computing device comprise a device brand and a device model of the mobile computing device.

Example 13: the mobile computing device of any of examples 8-12, wherein the secondary device comprises an ear-wearable device.

Example 14: the mobile computing device of example 13, wherein the ear-wearable device comprises a hearing aid or an earbud.

Example 15: the mobile computing device of any of examples 8-14, wherein the indication of the compatibility comprises an indication of whether the mobile computing device supports Android Streaming for Hearing Aids (ASHA).

Example 16: the mobile computing device of any of examples 8-15, wherein the indication of the compatibility comprises an indication prompting a user of the mobile computing device to update an operating system version of the mobile computing device.

Example 17: a computing system comprising processing circuitry configured to: receive, from a mobile computing device, a webpage request comprising a webpage Uniform Resource Locator (URL) and specifications of the mobile computing device; compare the specifications to a compatibility table associated with the webpage URL; determine based on the comparison, a device compatibility between the mobile computing device and a secondary device associated with the compatibility table; and transmit, to the mobile computing device, an indication of the device compatibility for display on a touchscreen of the mobile computing device.

Example 18: the computing system of example 17, wherein the specifications of the mobile computing device comprise a user agent of the mobile computing device.

Example 19: the computing system of example 17 or example 18, wherein the specifications of the mobile computing device comprise an operating system version of the mobile computing device.

Example 20: the computing system of any of examples 17-19, wherein the specifications of the mobile computing device comprise a device brand and a device model of the mobile computing device.

Example 21: the computing system of any of examples 17-20, wherein the secondary device comprises an ear-wearable device.

Example 22: the computing system of example 21, wherein the ear-wearable device comprises a hearing aid or an earbud.

Example 23: the computing system of any of examples 17-22, wherein the indication of device compatibility comprises an indication of whether the mobile computing device supports Android Streaming for Hearing Aids (ASHA).

Example 24: the computing system of any of examples 17-23, wherein the indication of the device compatibility comprises an indication prompting a user of the mobile computing device to update an operating system version of the mobile computing device to enable the compatibility between the mobile computing device and the secondary device.

What is claimed is:
1. A method comprising:
receiving, by a remote computing device from a mobile computing device, a webpage request comprising a webpage Uniform Resource Locator (URL) and specifications of the mobile computing device;
comparing, by the remote computing device, the specifications to a compatibility table associated with the webpage URL;
determining, based on the comparison, a device compatibility between the mobile computing device and a secondary device associated with the compatibility table; and
transmitting, by the remote computing device, an indication of the device compatibility for display on the mobile computing device,
wherein the indication of the device compatibility comprises an indication of whether the mobile computing device supports Android Streaming for Hearing Aids (ASHA).

2. The method of claim 1, wherein the specifications of the mobile computing device comprise an operating system version of the mobile computing device.

3. The method of claim 1, wherein the specifications of the mobile computing device comprise a device brand and a device model of the mobile computing device.

4. The method of claim 1, wherein the secondary device comprises an ear-wearable device.

5. The method of claim 4, wherein the ear-wearable device comprises a hearing aid or an earbud.

6. The method of claim 1, wherein the indication of the device compatibility comprises an indication prompting a user of the mobile computing device to update an operating system version of the mobile computing device.

7. A mobile computing device comprising:
an output device; and
processing circuitry configured to cause the mobile computing device to:
obtain a Uniform Resource Locator (URL) of a compatibility-checker webpage;
transmit, to a remote server, a webpage request comprising the URL and specifications of the mobile computing device;
receive, from the remote server, an indication of a device compatibility between the mobile computing device and a secondary device associated with the compatibility-checker webpage; and
output, via the output device, the indication of the device compatibility between the mobile computing device and the secondary device, wherein the indication of the device compatibility comprises an indication of whether the mobile computing device supports Android Streaming for Hearing Aids (ASHA).

8. The mobile computing device of claim 7, wherein:
the mobile computing device further comprises a camera configured to generate an image of a matrix barcode, and
the processing circuitry is configured to cause the mobile computing device to, as part of obtaining the URL, to determine the URL based on the matrix barcode.

9. The mobile computing device of claim 7, wherein the specifications of the mobile computing device comprise an operating system version of the mobile computing device.

10. The mobile computing device of claim 7, wherein the specifications of the mobile computing device comprise a device brand and a device model of the mobile computing device.

11. The mobile computing device of claim 7, wherein the secondary device comprises an ear-wearable device.

12. The mobile computing device of claim 11, wherein the ear-wearable device comprises a hearing aid or an earbud.

13. The mobile computing device of claim 7, wherein the indication of the device compatibility comprises an indication prompting a user of the mobile computing device to update an operating system version of the mobile computing device.

14. A computing system comprising processing circuitry configured to cause the computing system to:
receive, from a mobile computing device, a webpage request comprising a webpage Uniform Resource Locator (URL) and specifications of the mobile computing device;
compare the specifications to a compatibility table associated with the webpage URL;
determine based on the comparison, a device compatibility between the mobile computing device and a secondary device associated with the compatibility table; and
transmit, to the mobile computing device, an indication of the device compatibility for display on a touchscreen of the mobile computing device, wherein the indication of the device compatibility comprises an indication of whether the mobile computing device supports Android Streaming for Hearing Aids (ASHA).

15. The computing system of claim 14, wherein the specifications of the mobile computing device comprise an operating system version of the mobile computing device.

16. The computing system of claim 14, wherein the specifications of the mobile computing device comprise a device brand and a device model of the mobile computing device.

17. The computing system of claim 14, wherein the secondary device comprises an ear-wearable device.

18. The computing system of claim 14, wherein the indication of the device compatibility comprises an indication prompting a user of the mobile computing device to update an operating system version of the mobile computing device to enable the device compatibility between the mobile computing device and the secondary device.

* * * * *